W. OSMOND.
AUTOMOBILE LAMP GEAR.
APPLICATION FILED MAY 3, 1912. RENEWED SEPT. 18, 1914.
1,136,831. Patented Apr. 20, 1915.
3 SHEETS—SHEET 1.
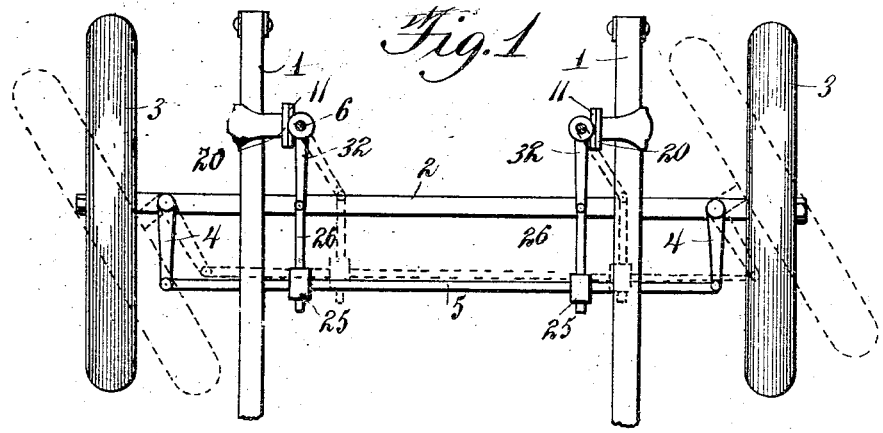
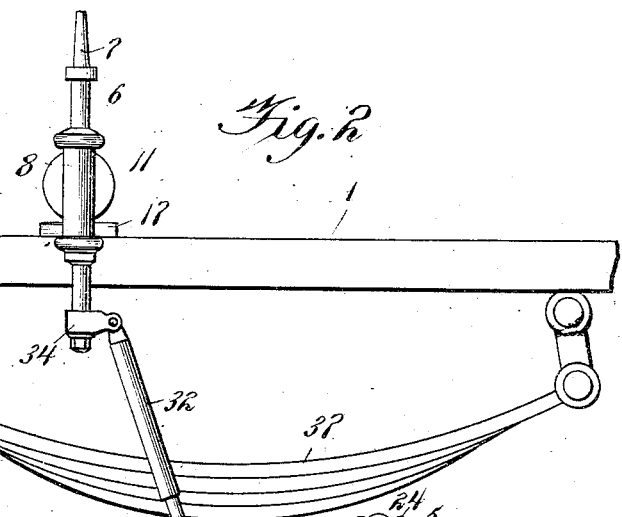
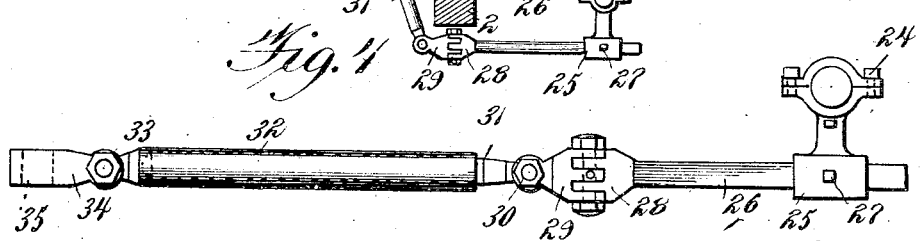
Witnesses
W. S. McHowell
R. M. Smith
Inventor
William Osmond
By Victor J. Evans
Attorney

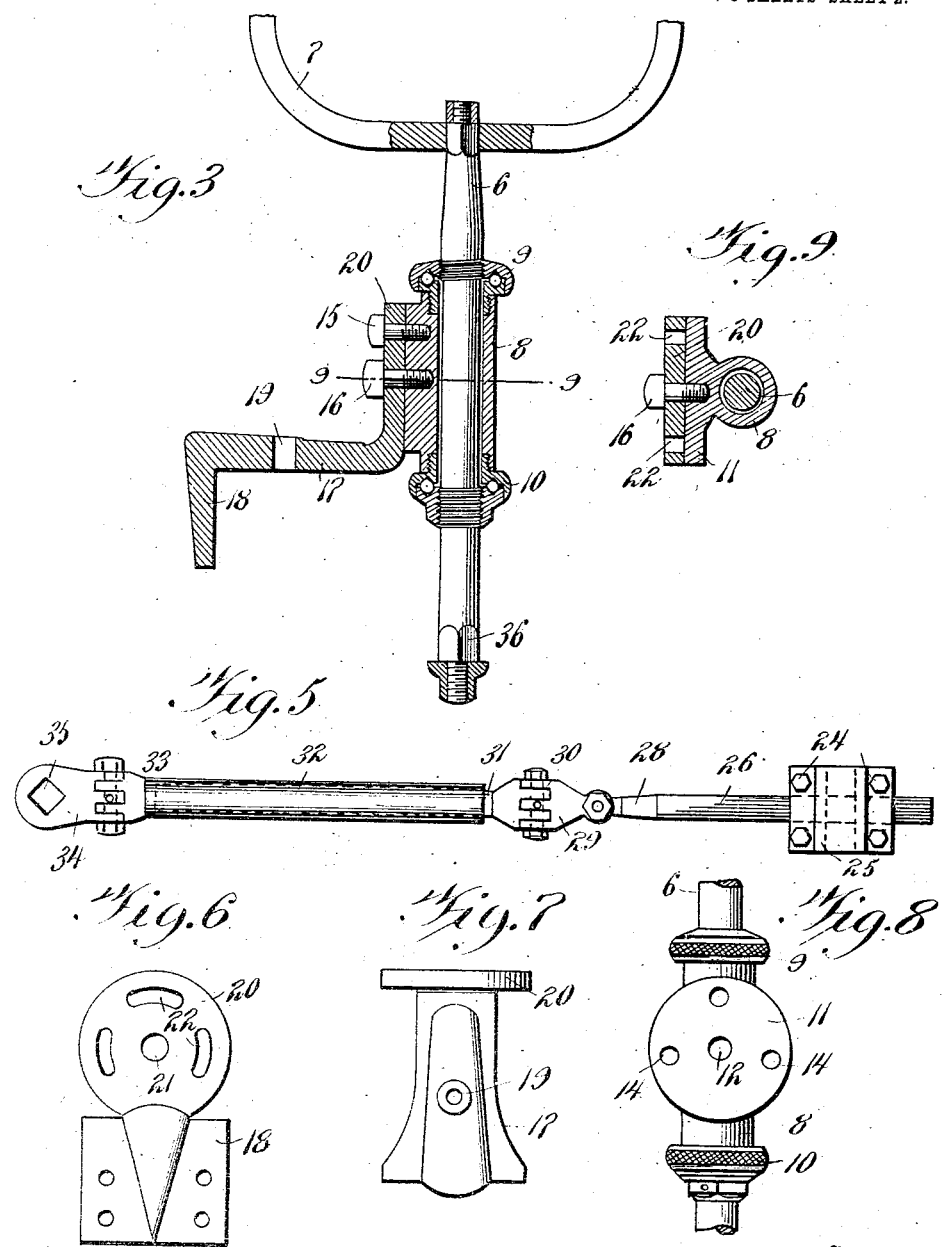

W. OSMOND.
AUTOMOBILE LAMP GEAR.
APPLICATION FILED MAY 3, 1912. RENEWED SEPT. 18, 1914.
1,136,831.
Patented Apr. 20, 1915.
3 SHEETS—SHEET 3.
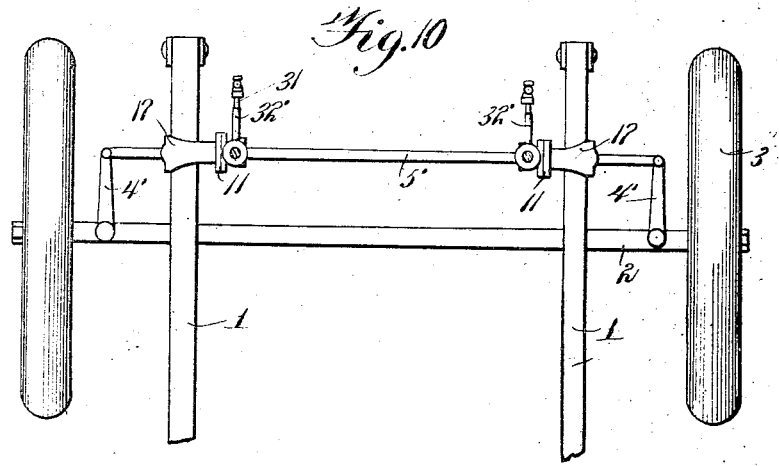
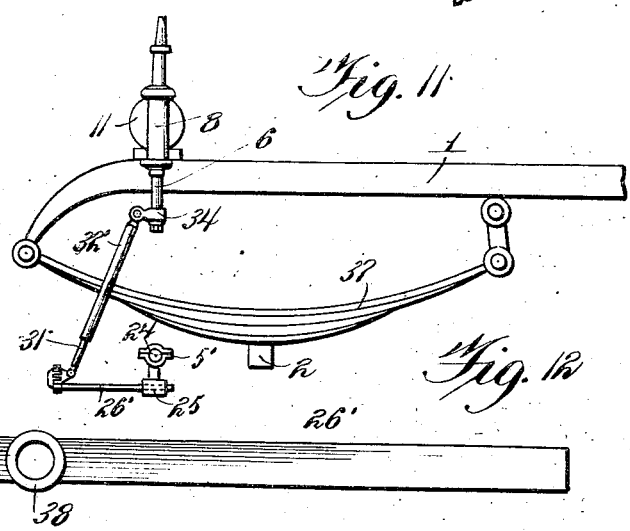
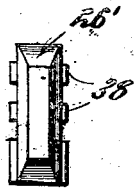
Witnesses
W. S. McDowell
P. M. Smith
Inventor
William Osmond
By Victor J. Evans
Attorney

UNITED STATES PATENT OFFICE.

WILLIAM OSMOND, OF SCRANTON, PENNSYLVANIA.

AUTOMOBILE LAMP-GEAR.

1,136,831.  Specification of Letters Patent.  Patented Apr. 20, 1915.

Application filed May 3, 1912, Serial No. 694,862. Renewed September 18, 1914. Serial No. 862,404.

*To all whom it may concern:*

Be it known that I, WILLIAM OSMOND, a citizen of the United States, residing at Scranton, in the county of Lackawanna and State of Pennsylvania, have invented new and useful Improvements in Automobile Lamp-Gear, of which the following is a specification.

This invention relates to automobile lamp gears, the object in view being to provide simple and effective means capable of ready and easy attachment to the standard automobile now in common use, whereby in the operation of turning the front steering wheels of the machine, the lamps are correspondingly turned in such manner that the rays of light from the lamps are directed forward in lines parallel to the path of movement of such steering wheels of the machine, with the result that the roadway is fully illuminated in the direct path which the machine is caused to travel by reason of the angle at which the steering wheels are set.

With the above and other objects in view, the invention consists in the construction, combination and arrangement of parts, as will be hereinafter more fully described, illustrated in the accompanying drawings, and pointed out in the claim hereunto appended.

In the accompanying drawings: Figure 1 is a plan view of the front portion of an automobile, showing the application of the present invention thereto. Fig. 2 is a side elevation of the same, omitting the steering wheels. Fig. 3 is an enlarged vertical section taken in line with one of the lamp carrying shafts. Fig. 4 is a side elevation of the universal lever. Fig. 5 is a plan view thereof. Fig. 6 is a side elevation of the lamp bracket. Fig. 7 is a plan view thereof. Fig. 8 is a face view of the bearing tube, showing the means for attaching the same to the bracket head. Fig. 9 is a detail horizontal section illustrative of the connection between the lamp shaft tube and the bracket. Fig. 10 is a plan view similar to Fig. 1, showing the device adapted for use where the steering arm connecting rod is located in advance of the axle. Fig. 11 is a side elevation of the same. Fig. 12 is an enlarged plan view of the operating arm. Fig. 13 is a side elevation of the same. Fig. 14 is an end view thereof.

Referring to the drawings, 1 designates the oppositely arranged side bars of the chassis of an automobile, 2 the front axle, 3 the steering wheels, 4 the steering arms, and 5 the steering arm connecting rod, which is jointed to the arms 4 for giving parallel motion thereto when the steering wheels are turned, all of said parts being of the usual standard construction and arrangement, the connecting rod 5 being located in rear of the vertical plane of the front axle 2.

In carrying out the present invention, I employ in connection with each lamp or search-light a vertical lamp carrying shaft 6 having the usual lamp supporting yoke or bracket 7, securely fastened to the top thereof, so as to turn therewith. The shaft 6 passes through a bearing tube 8 provided at the top with a ball bearing 9, and at the bottom with another ball bearing 10, said ball bearings being of the usual construction to support and admit of the free turning movement of the shaft 6 within the tube 8, said ball bearings also providing for taking up or adjusting wear, whereby the shafts may be kept in perfect working condition at all times.

The bearing tube 8 is provided at one side with a circular flanged head 11 provided with a central hole 12, and a concentric series of holes 14 which are threaded to receive clamping screws 15, the hole 12 being threaded to receive a screw 16 forming a center or pivot, upon which the bearing tube 8 may be turned and adjusted, for a purpose which will hereinafter appear.

In connection with each bearing tube 8, I employ a supporting bracket 17 having an L-shaped pendant extension 18 which bears against the outer side of the chassis, the said bracket being provided with a hole 19, by which it may be bolted or riveted to the frame of the machine. At its projecting end, the bracket is provided with a circular head portion 20 having a central hole 21 for the screw 16, and a series of concentric slots 22 to receive the screws 15, this construction and arrangement adapting the bearing tube 8 to be set in a perfectly vertical position and securely fastened in such position. This adds materially to the smooth working properties of the device as a whole.

Secured to the connecting rod 5, exactly in rear and in longitudinal alinement with the lamp carrying shaft 6 when the wheels 3 are set perpendicular to the front axle 2, are clamps 24 divided, as shown, so as to adapt them to be placed over and secured to the connecting bar 5, the two parts of the divisional clamp being secured together by screws or their equivalent. At the bottom of each clamp there is a square socket tube 25 adapted to receive a forwardly projecting rigid arm 26 square in cross section to fit in the socket, in which it is held, when properly adjusted, by means of a binding screw 27.

Connected to the forward extremity of each arm 26 by means of a knuckle joint 28 is a yoke piece 29 which is connected by another knuckle joint, at 30, to a telescopic lever, comprising an inner member 31 and an outer member or tube 32 adapted to slide longitudinally upon the inner member 31. At its outer end the telescopic universal lever has connected thereto, by a knuckle joint at 33, a collar 34 having a square hole 35 therein adapted to fit tightly upon the squared lower extremity 36 of the corresponding lamp carrying shaft 6, the collar 34 forming a jointed extension of the telescopic lever comprising the members 31 and 32.

It will be understood that by reason of the several knuckle joints in each of the universal levers, said levers may adjust themselves to the movement between the frame of the machine and the front axle and connecting rod 5, it being apparent by reference to Fig. 2 that the frame bars 1 have an up and down movement relative to the axle 2, on account of being mounted thereon by means of the interposed springs 37, and the telescopic construction of said levers permits of the free relative movement between the wheels and the frame of the machine.

By reference to Fig. 1, it will be observed that the forward extremities of the arms 26 are directly in line with the axle 2, and the arms 26 should be of the same length as the universal levers, or in other words, the lamp shafts should be arranged at a distance in advance of the axle equal to the distance of the connecting rod 5 in rear of said axle. In order to enable the mechanism to operate smoothly, the universal levers should be of a length exactly equal to the steering arms 4, on which the wheels 3 are mounted. In Fig. 1, I have indicated by dotted lines the movements of the parts above described, and it will be observed that it matters not at what angle the wheels 3 of the machine are adjusted, the lamp shafts will be turned a corresponding degree, and therefore, the rays of light from the lamps are always directed in planes parallel to the path of movement of the steering wheels. This illuminates the exact portion of the roadway which is to be traversed by the automobile, and the same is accomplished by simple mechanism not liable to get out of order, and which may be easily maintained in perfect working condition.

The mechanism hereinabove described may be equally as well adapted for use in connection with the steering arm connecting rod located in advance of the axle, as shown in Figs. 10 to 14, inclusive, wherein it will be observed that instead of the arm 4 projecting rearwardly from the axle, said arm, designated as 4', extends in advance of the axle, the two arms 4' being connected by the rod 5'. Under this arrangement, the teletom of the lamp shaft forward and connects to the forward end of the arm 26'. The knuckles 38 of said arm extend rearwardly from the forward extremity thereof, as shown in Figs. 12 and 13. It will be observed that the extremity of the arm 26' is located as far in advance of fthe rod 2' as said rod is located in advance of the axle 2, so that as the wheels 3 are turned, a corresponding movement will be given to the lamps which will be caused to face in the same direction as the wheels, and project their rays of light directly in the path to be traveled by the machine.

What is claimed is:

In an automobile, the combination with the steering knuckle lever arms and the connecting rod joining said arms and located in parallel relation too the front axle, of vertical lamp carrying shafts journaled in advance of the vertical plane of the front axle, lever arms on the lamp carrying shafts having the same sweep or radius of movement as the knuckle lever arms, and rigid arms fastened to said connecting rod intermediate of the ends thereof and extending at right angles thereto, the lever arms of the lamp shafts being connected to said shafts by a knuckle joint having movement on a horizontal axis only, each of the last-named lever arms embodying telescopic sections.

In testimony whereof I affix my signature in presence of two witnesses.

WILLIAM OSMOND.

Witnesses:
 BENJ. LLOYD,
 WILLIAM DAVIS.